United States Patent [19]

Baker et al.

[11] 4,342,530
[45] Aug. 3, 1982

[54] WATER DAM FOR A FASTENER

[75] Inventors: Douglas H. Baker; Dennis P. Dry, both of York, Pa.

[73] Assignee: Allis-Chalmers Corporation, Milwaukee, Wis.

[21] Appl. No.: 47,111

[22] Filed: Jun. 11, 1979

[51] Int. Cl.³ .................. F16B 35/00; B65D 53/00
[52] U.S. Cl. .................. 411/374; 277/189; 277/212 FB
[58] Field of Search .................. 85/1 JP, 56, 53, 1.5, 85/9 R, 1 R, 1 T; 277/189, 166, 212 FB; 403/408; 411/374, 373, 376, 371, 429

[56] References Cited

U.S. PATENT DOCUMENTS

| 70,193 | 10/1867 | Gardner | 411/374 |
| 116,990 | 7/1871 | Plunkett | 85/56 |
| 3,601,823 | 8/1971 | Isaacs | 85/56 X |

FOREIGN PATENT DOCUMENTS

| 457645 | 5/1950 | Italy | 85/53 |
| 1138790 | 1/1969 | United Kingdom | 85/56 |

Primary Examiner—Ramon S. Britts
Attorney, Agent, or Firm—Robert C. Jones

[57] ABSTRACT

A water dam in the form of a cup is secured around the head of a fastener to confine water that leaks pass the fastener to a localized area.

1 Claim, 2 Drawing Figures

WATER DAM FOR A FASTENER

BACKGROUND OF THE INVENTION

In many machine installations, especially in installations wherein massive portions of the machines are fabricated and machined separately such as in the case of hydraulic turbines, the stay ring is machined, drilled and tapped at one setup. At a later time the outer headcover is machined, spot faced and drilled to provide access openings for the insertion of bolts for joining the outer headcover to the stay ring. In these instances, heavy hex screws with spherical washers are utilized to secure the various members together. It is especially difficult to establish a seal to prevent water leakage around the screws entering into the intermediate headcover cavity. In the past, various types of sealants have been used with varying degrees of success, but none have been completely successful in providing a complete seal to prevent water leakage around the screws and water would fill up the cavity in the headcover and enter into the powerhouse chamber. Lead washers or similar deformable metallic material has been used below the bolt head but this has not proven successful since the lead washers flatten out on one side and split. Rubber has been tried but proven unsuccessful as it did not seal properly and would blow out through the opening.

DESCRIPTION OF THE INVENTION

Figure 1:
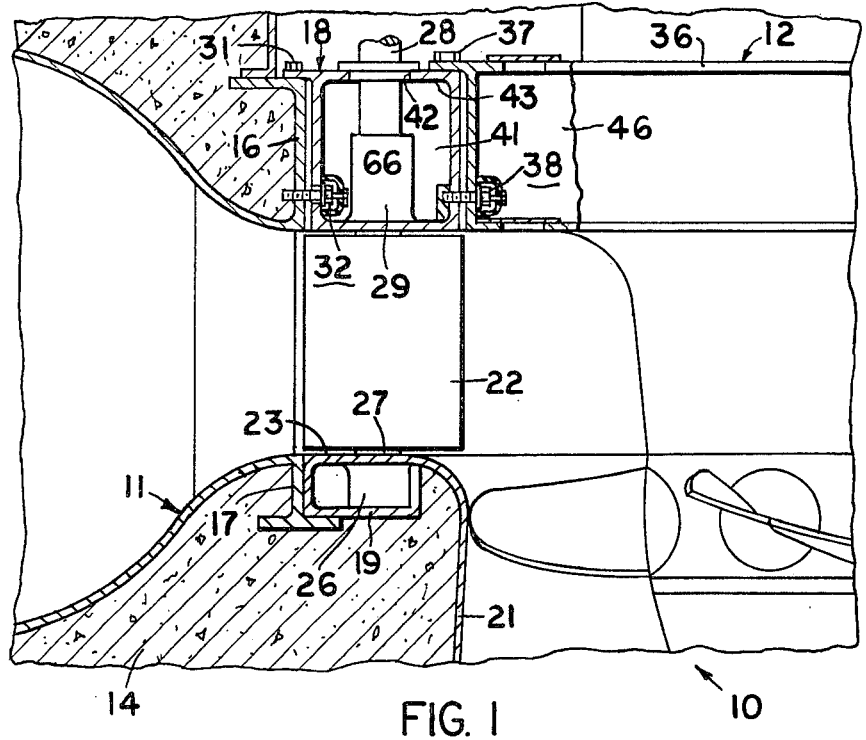
FIG. 1 is a fragmentary sectional view through a turbine showing the stay ring and headcover assembly in which the present invention is incorporated; and, FIG. 2 is an enlarged view of a screw cover sealing a screw fastener joining the headcover to the stay ring and incorporating the present invention.
Figure 2:
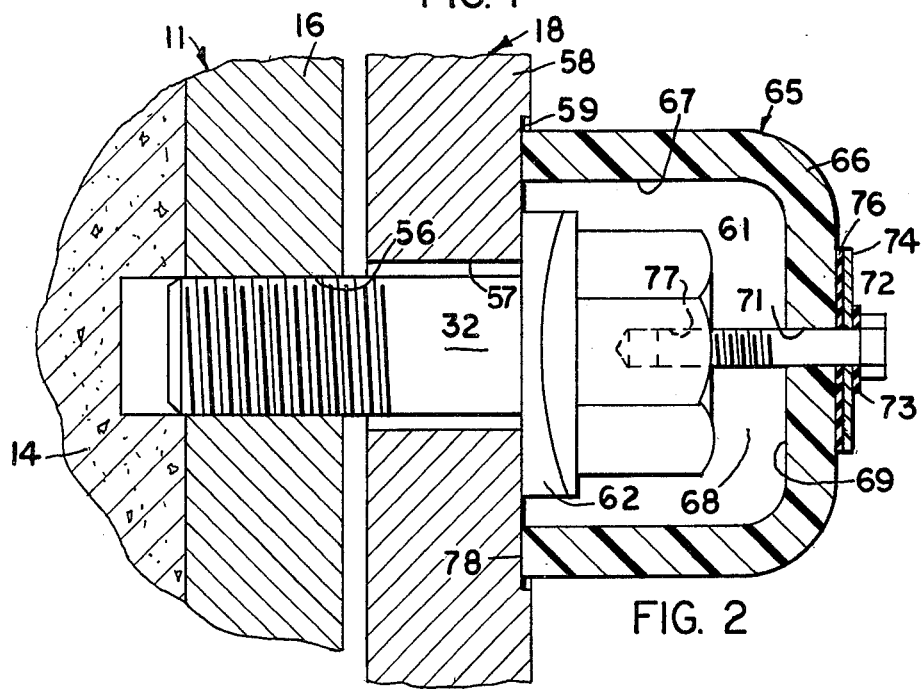

As shown in FIG. 1, a hydraulic turbine 10 includes a stay ring assembly 11 and a headcover assembly 12. The stay ring assembly 11 is fabricated separately from the headcover and usually cast into concrete turbine base 14 sometimes prior to the headcover 12 being attached. As shown, the stay ring 11 includes upper and lower circular flange portions 16 and 17 to which other portions such as the headcover 12 is attached.

The headcover assembly 12 includes an outer circular headcover 18 which in cross section is of boxlike configuration. Below the outer cover and spaced therefrom is a circular discharge ring support portion 19 which in cross section is of box-like configuration. The discharge ring 21 is welded or integrally formed with the support portion 19. The assembly is casted in the concrete base 14 at the time that stay ring 11 is placed.

A plurality of wicket gates, one of which is depicted at 22, are disposed within the opening 23 formed between the bottom of the outer headcover 18 and the discharge ring support 19. The wicket gate 22 exemplifies all of the gates and each includes a lower bearing 26 in which the lower portion 27 of the wicket gate shaft 28 is journalled. Within the outer headcover 18 there are a plurality of support bearings 29 in which the upper portion of the wicket gate shafts 28 are supported.

Securing of the outer headcover 18 in operative position is accomplished by fasteners which secure it to the upstanding circular flange portion 16 as by a plurality of hex screws 31 and a plurality of inner side hex screws 32. Secured to the outer headcover 18 is an inner headcover 36 which is shop fabricated and fastened as by a plurality of hex screws 37 and a plurality of inner hex screws 38.

In order to place the inner screws 32 in operative position, access into the cavity 41 of the outer headcover 18 is provided by means of hand holes 42. The hand holes 42 are formed in the upper wall 43 of the outer headcover 18. It is to be understood that a plurality of hand holes 42 are provided so as to provide access for inserting all of the screws 32 in position. In a similar manner, access into the cavity 46 of the inner headcover 36 is provided by a plurality of hand holes 47.

As previously mentioned, the opening in the flange 16 of the stay ring 11 is drilled and tapped to a machine layout as at 56 prior to the stay ring 11 being encased in the concrete base 14. The complementary opening 57 in the sidewall 58 of the outer headcover 18 is also drilled to a machine layout some time later. In order to accomplish this, the opening 57 is drilled from the outside of the headcover. At this time, the inner surface of the wall 58 is spot faced as at 59 to provide a smooth surface. However, the spot face 59 is usually out of line with respect to the axis of the radial centerline of both of the openings 56 and 57. In other words, the face surface 59 is not perpendicular to the radial axis of both of the holes 56 and 57. Thus, when the screw 32 is inserted through the opening 57 into threaded engagement in the threaded opening 56 of the stay ring flange, the axis of the screw 32 does not coincide with the axis of the opening 57 and a positive seal cannot be obtained between the head 61 of the screw 32 and the spot face 59 even with the use of a spherical washer 62. If a seal is not obtained, the water under pressure passes from the wicket gate space 23 around the bolts 32 and through the opening 57 into the cavity 41 which is highly undesirable. The same condition pertains in connection with the screws 38. Water leakage passing these screws will enter into the cavity 46 of the inner headcover. The exclusion of water from the headcover cavities 41 and 46 is necessary so as to exclude water from the powerhouse room.

To prevent water leakage through the opening 56 around the screw threads and through the opening 57 into the cavity 41 there is provided a dam or cover means 65 for enclosing the area around the screw head 61 to prevent water from escaping into the cavity 41. As shown, the cover means 65 includes a cup like cover 66 having a cavity 67. The cover 66 is of a size so that the cavity 67 is sufficiently large to enclose the head 61 and the washer 62 with the cavity 67 and still provide sufficient head room space 68 between the top surface of the screw head and the inside dam surface 69 of the cover. The cover 66 when in operating position seats on the spot face surface 59. The cup cover 66 is of an elastomer material preferably of neoprene, or an ethylene-propylene rubber, of a hardness of 70 durometer test and is molded into its cup like format using a single cavity mold. In the molding process, an opening 71 is provided the diameter of which is less than the diameter of a securing hex cap screw 72. To lock the cup cover in operative sealing position, the hex cap screw 72 is provided with a rubber washer 73 and relatively large diameter steel washer 74 and another rubber washer 76. The hex cap screw 72 is then forced through the opening 71 into threaded engagement in an axially lapped opening 77 in the head 61 of the fastener hex screw 32. The cap screw 72 is snugged up to firmly seat the cup cover 66 on the surface 59. The cup being of an elastomer material, the rim surface 78 of the cup cover will deform so as to intimately engage the surface 59 and filling any inequalities therein such as scratches, pits, etc. The opening 71 in the cover 66 through which the cap screw 72 passes being of diameter which is less than the diameter of the screw 72 has the effect of molding the material of the cover around the screw. This effectively resists water leakage around the screw. The steel washer 74 under the cap screw head effectively spreads the clamping force exercised by the cap screw cover a relatively large area of the head surface of the cover. The rubber gasket or washer 73 seals the opening in the steel washer 74 through which the cap screw passes.

It is apparent that water leaking pass the heavy hex screw 32 and spherical washer 62 will be confined within the elastomer cover thereby preventing leakage into the outer headcover cavity 41.

The embodiments of the invention in which an exclusive property or privilege is claimed are defined as follows:

1. Apparatus for confining water that leaks past a component fastener in a hydro-turbine machine to a localized area, comprising in combination:

a fastener comprising a relatively heavy screw having an enlarged head portion and a shank portion with securing means thereon, said fastener passing through an opening formed in a first component into threaded engagement in an opening in a second component to which said first component is to be secured;

a spot face surface formed on the component which is to be secured and constructed and arranged to be engaged by the head of said fastener;

a cup-shaped enclosure member molded in a single cavity mold of an elastomer material disposed in position on said spot face surface surrounding the head portion of said fastener;

securing means comprising a threaded screw to lock said cup-shaped enclosure member in operative fastener enclosing position to the component which said fastener is securing, said threaded screw securing means being constructed and arranged to pass through a circular opening formed in said cup-shaped enclosure and into threaded engagement with said fastener, said threaded screw securing means having a diameter which is greater than the diameter of said circular opening formed in said enclosure through which said screw securing means passes and operable to force said enclosure into intimate sealing contact with the spot face surface;

a threaded opening in the head of said fastener screw in which said threaded screw securing means engages; and, a relatively large washer externally of said cup-shaped enclosure member engaged on said threaded screw securing means and extending to a substantial extent radially outwardly thereof so that the head portion of said threaded screw securing means applies a clamping force thereto which said washer distributes over a relatively large area of said cup-shaped enclosure member.

* * * * *